July 3, 1962
L. E. REINOWSKI ET AL
3,042,098
PUNCTURE-SEALANT COMPOSITION AND TUBELESS
PNEUMATIC TIRE CONTAINING SAME
Filed July 1, 1958
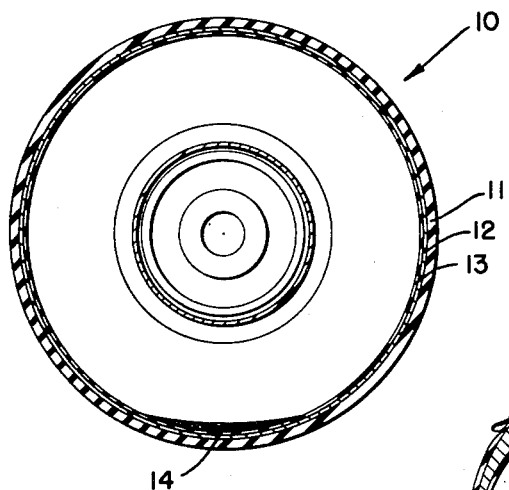
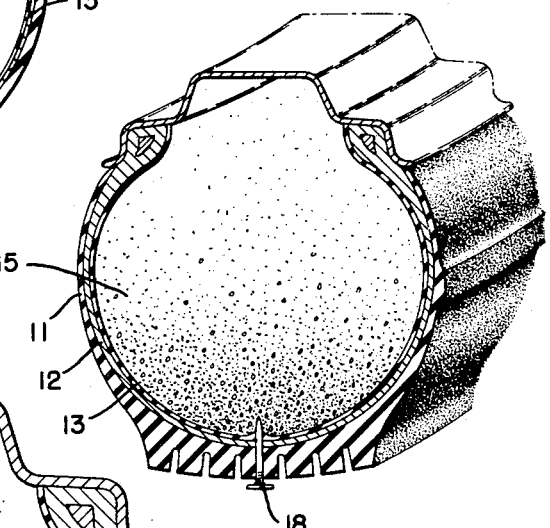
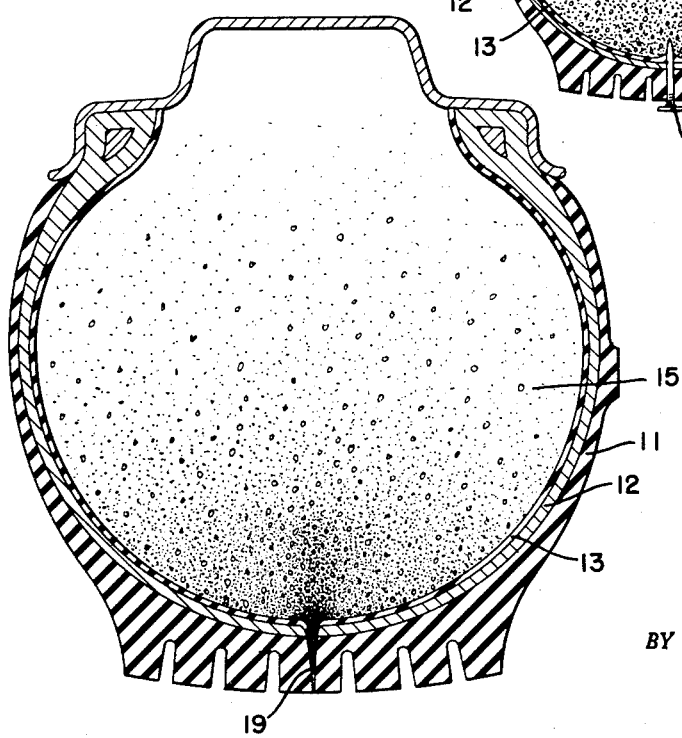
INVENTORS
LEONARD E. REINOWSKI
HERBERT B. HINDIN
ROBERT D. SEELEY
BY
James J. Long
AGENT.

United States Patent Office 3,042,098
Patented July 3, 1962

3,042,098
PUNCTURE-SEALANT COMPOSITION AND TUBELESS PNEUMATIC TIRE CONTAINING SAME
Leonard E. Reinowski, Mount Clemens, Herbert B. Hindin, Grosse Pointe Woods, and Robert D. Seeley, St. Clair Shores, Mich., assignors to United States Rubber Company, New York, N.Y., a corporation of New Jersey
Filed July 1, 1958, Ser. No. 745,968
12 Claims. (Cl. 152—347)

This invention relates to a particulate puncture-sealant composition for use in a tubeless pneumatic tire having an air-retaining liner, as well as to a tubeless tire containing such sealant composition.

A principal object of the invention is to reduce the rate of deflation of a tubeless pneumatic tire, having an air-retaining liner, when such liner is accidentally punctured by a piercing object, such as a nail.

Another object is to provide a tubeless tire, embodying an effective puncture sealant composition which does not impair the performance characteristics of the tire, and which does not interfere with the repairability of the tire.

Still a further object is the provision of a puncture sealant which can be applied either to new or to used tires, and which can also be applied in the field.

Further objects and advantages of the invention will be made manifest in the following detailed description, which is intended to be read with reference to the accompanying drawing, wherein:

FIG. 1 is a circumferential sectional view of a tubeless tire in a static condition, containing particulate sealant in accordance with the invention, mounted on a wheel;

FIG. 2 is a fragmentary perspective view, on a larger scale, of the tire of FIG. 1 in a dynamic condition, showing a piercing object extending through the tire; and FIG. 3 is a view similar to FIG. 2, but on an enlarged scale, with the piercing object removed, showing some of the sealant in operative position in the puncture.

The puncture sealant composition of the invention comprises a mixture of particles of varying size distribution which tumble freely within a tire casing while the tire is in use. When the liner of the tire is punctured the particles of the sealant composition are swept into the puncture, where they agglomerate. The particles employed have a surface texture such that they tend to agglomerate when worked together under moderate pressure, especially under the influence of heat. Thus, when the particles enter into a puncture in the air retaining liner of the tubeless tire casing, they are subjected to mechanical working and to application of pressure, as well as heat generated by the working, and the particles thereby agglomerate within the puncture. As a result, flow of air through the puncture in the liner is very much reduced, if not virtually stopped. The sizes of the particles in the sealant composition vary from very fine particles capable of entering into small openings, to rather coarse particles which enter into larger openings. In typical punctures the progressively smaller particles tend to fill up the interstices between the progressively larger particles.

In general, the preferred composition of the invention comprises particles of vulcanized rubber, in admixture with carbon black. Especially preferred is that kind of carbon black known as acetylene black. The vulcanized rubber particles are in general more coarse than the carbon black particles, and typically the size of the vulcanized rubber particles will range from that just retained on about an 8 mesh screen to that just passing through about a 100 mesh screen. Typically the vulcanized rubber particles will contain progressively varying sizes and will fall within the range of from about 6 mesh to about 200 mesh with relatively few, if any, particles appreciably larger or smaller than those extremes. The mixture usually contains from 5 to 75 parts by weight of carbon black and correspondingly 95 to 25 parts of vulcanized rubber, in 100 parts of the mixture of the two materials. It is preferred to have at least enough carbon black present to coat entirely the surface of the vulcanized rubber particles and the tire casing, and have at least 5 parts of carbon black left over that is free to tumble as such with the vulcanized rubber particles. In some cases, in order to retain a coating of the mixture on the entire surface of the tire casing under static conditions, it may be desirable to coat the interior surface of the casing with a tacky material, such as a cement made of raw butyl rubber dissolved in gasoline.

Generally the vulcanized rubber particles are made up at least in part of a non-black rubber, such as buffings of white sidewall stock, comminuted rubber bands, fragmented vulcanized gum rubber, etc. Vulcanized particles of this kind are characterized by a certain tendency to mat together when subjected to pressure, especially at a moderately elevated temperature.

We find it desirable to employ, along with such non-black particles, particles of vulcanized rubber reinforced with carbon black, such as vulcanized black rubber abrasions, tread raspings (such as airplane tread raspings), and similar vulcanized carbon black reinforced rubber particles. Frequently the vulcanized rubber particles employed are made up of about 20–80% by weight of non-black stock and correspondingly about 80–20% of black stock.

Such vulcanized rubber particulate materials are readily available as processing scrap, particularly from the tire industry, and for purposes of the invention it is a matter of indifference whether the stocks be based on natural rubber, or on any of the synthetic rubbers used in the tire industry (such as GR-S, butyl rubber, polychloroprene, etc.), or mixtures thereof. Conventional white sidewall stocks, tread stocks, etc., are suitable. The admixture of carbon black reinforced vulcanized rubber particles to the non-black particles is particularly desirable because the commercially available forms of these processing wastes provide, when mixed together, the desired wide distribution of particle sizes.

In one form of the invention, the tendency of the vulcanized rubber particles to mat together under the influence of pressure and moderate heat is enhanced by subjecting the particles to oxidizing conditions. This may be accomplished, for example, by heating the vulcanized particles in an air oven (for example, at a temperature of 150°–300° F. for a period of from 5 hours to 2 days). Oxidation appears to alter favorably the surface characteristics of the vulcanized rubber particles, possibly by causing reversion at the surface, so that the particles display an increased tendency to agglomerate or mat together when pressed, as required for performance of the desired function of the sealant composition. However, the particles do not become actually tacky as a result of such oxidation treatment, but instead the material retains essentially the character of a powder which can be tumbled. It is believed that there is a tendency for such favorable oxidation to take place in the tire under normal operating conditions. This is evidenced by the fact that the performance of the sealant composition of the invention improves after a period of service. Frequently we subject only a portion of the vulcanized rubber particles, say from 10% to 50% of the vulcanized rubber particles, to the oxidizing treatment. However, we may oxidize 100% of the rubber particles.

A particularly advantageous feature of the invention resides in the employment of the acetylene type of carbon black. This kind of carbon black is characterized by the fact that the particles are joined together in a chain-like fashion. It has been found that acetylene black is particularly effective, in combination with vulcanized rubber particles, in performing the desired sealing function, which will be described in more detail below.

The following examples, in which all parts are expressed by weight, will serve to illustrate the practice of the invention in more detail.

*Example 1*

| | Parts |
|---|---|
| 60 mesh abrasions of vulcanized white sidewall stock | 25 |
| 100 mesh vulcanized black rubber abrasions | 25 |
| Acetylene carbon black (made by Shawinigan Products Corp.) | 25 |
| Oxidized 8 mesh airplane tread raspings (subjected to 20 hours of over oxidation at 220° F.) | 25 |

The mixture is a dry, free-flowing powder. Tubeless tires having air retaining liners, and containing the foregoing sealant composition, were run for distances of from 32 to 164 miles after being punctured with a nail, before air loss failure.

*Example 2*

| | Parts |
|---|---|
| Acetylene carbon black | 33.3 |
| 100 mesh black vulcanized rubber grindings | 33.3 |
| 60 mesh white vulcanized rubber grindings | 33.3 |

*Example 3*

| | Parts |
|---|---|
| 60 mesh abrasions of vulcanized white sidewall stock | 20 |
| 100 mesh vulcanized black rubber abrasions | 20 |
| Acetylene carbon black | 20 |
| Airplane tread raspings, oxidized as in Example 1 | 20 |
| 100 mesh thermosetting phenol-formaldehyde resin "Durez 12687") | 20 |

Tubeless tires having air-retaining liners and containing the foregoing sealant composition showed reduced tendency to fling out the puncturing nail at high speeds and it was also noted that the holes tended to be of reduced size. After puncture by nails, the tires containing this type of sealant could be run for from 108 to 218 miles. The nail in such a puncture tends to become very hot from scuffing on the roadway, and such heat causes the resin to set or cure on the inner protruding portion of the nail, thus tending to fix the nail in place so that it is not easily thrown out. In this example, the phenol-formaldehyde resin can be replaced by any other conventional thermosetting resin, suitably in amount of about 5 to 30 parts, per 100 parts of the mixture, usually in about the 50–200 mesh size range. Thermoplastic resins may also be used.

The manner in which the sealant composition of the invention is believed to function will now be explained in more detail in conjunction with the accompanying drawing. Referring to the drawing, a conventional tubeless tire 10, comprised of the usual outer rubber tread and sidewall 11, superimposed on a fabric-reinforced carcass 12, has an air-retaining liner 13 of appreciable thickness vulcanized to the inner or band ply surface of the carcass in accordance with usual practice. The liner is made of an elastic, resilient air-impervious vulcanized rubber composition. It is desired to emphasize that the sealant composition of the invention is operative only with such an integral air-retaining liner, which is in essentially a relaxed state, in contrast to an inner tube, which is under a state of considerable extension. The sealant composition of the invention may be placed in the tire before it is mounted, or it may be introduced to a mounted tire by deflating and displacing the bead, suitably in amount of about 2–3 ounces for an ordinary passenger car size tire. A proportionately greater amount, e.g. 5 ounces may be used in a tubeless truck tire. When the tire is static the sealant material tends to fall to the lower portion of the casing as an accumulation 14, as indicated in FIG. 1, whereas when the tire is rotating the sealant composition tends to tumble about as a free flowing material 15 as shown in FIGS. 2 and 3, and there is a tendency to form a coating over a large part of the surface of the liner 13.

When the tire casing is pierced by a puncturing object such as a nail 18 (FIG. 2), a hole 19 (FIG. 3) is formed and the rush of air toward such hole tends to carry a considerable number of particles of the sealant material into the hole. At least a few of the first particles to arrive are so large that they become lodged or wedged in the hole, thereby restricting the opening so that only comparatively small particles can now pass through. Very soon particles of intermediate size become caught in the passageways between the larger particles, further restricting the opening. In this way successively smaller particles become trapped in the interstices between the relatively larger particles, until eventually the extremely finest particles are trapped and serve to seal off the opening almost entirely.

Since the air-retaining liner is in an essentially relaxed condition, that is, it is not under pronounced extension like an inner tube, it tends to "work" as the tire revolves, producing a kind of compressing action at the opening and tending to press the edges of the liner at the opening inwardly. As the tire revolves the liner thus tends to exert a kind of compacting action on the sealant material, pressing the material and working it. This working tends to heat the material, and this plus the pressure exerted tends to cause the particles of rubber to mat together. Loss of air through the hole is thereby greatly reduced, so much so that under typical conditions sufficient air will be retained to enable the automobile to be driven to a place where a permanent repair can be made. In practice, it is frequently found possible to drive the vehicle some 500–1000 miles after a puncture without necessity for re-inflation. The danger and inconvenience of sudden deflation upon puncturing is thereby substantially eliminated by the invention.

Even after the tire goes flat, it can be reinflated and run for a considerable distance. In fact, it has been observed that the sealant is if anything even more effective after reinflation than it was originally.

As will be apparent to those skilled in the art the invention therefore possesses manifold advantages. Unlike the usual plastic sealant compositions conventionally used in tubeless tires there is no tendency for the present sealant to cause imbalance or vibration or similar riding or steering difficulties. There is no problem of keeping the present sealant in its proper operative position, whereas with the conventional plastic sealants, if they are viscous enough to stay in place they are not fluid enough to seal properly, while if they are fluid enough to seal properly they are not viscous enough to stay in place. With the present sealant, there is no problem of change of viscosity with age or with temperature.

Conventional plastic sealants represent an appreciably increased thickness at the crown and shoulder of the tire, where heat build up is thus aggravated, to the detriment of the life of the tire.

The conventional plastic sealant usually has to be incorporated during manufacture of the tire, by a generally time consuming and expensive extra operation, whereas the present composition is easily applied anytime before or after mounting the tire.

Conventional plastic sealants interfere with proper repair of the tire, whereas the present composition does not. Recapped tires are easily provided with the present sealant, whereas providing recapped tires with a new plastic sealant is a difficult operation. The present sealant does not in any way interfere with the recapping.

The present sealant is effective in the shoulder and upper sidewall area of the tire, unlike the usual plastic sealants which are of necessity generally confined essentially to the crown of the tire.

Having thus described our invention, what we claim and desire to protect by Letters Patent is:

1. A dry, free-flowing particulate sealant composition for use in a tubeless pneumatic tire having an integral air-retaining liner, comprising, in intimate admixture, acetylene carbon black and oxidized vulcanized rubber particles, the degree of oxidation being such that the rubber particles display an increased tendency to agglomerate together when pressed but do not actually become tacky, said degree of oxidation having been obtained by heating said vulcanized rubber particles at a temperature of from about 150 to 300° F. for a period of from about 5 hours to 2 days, such sealant mixture containing from 5 to 75 parts by weight of carbon black and correspondingly from 95 to 25 parts of rubber particles, said rubber particles varying in size within the range of from 6 mesh to 200 mesh.

2. A dry, free-flowing particulate sealant composition for use in a tubeless pneumatic tire having an integral air-retaining liner, comprising, in intimate admixture, from 5 to 75 parts by weight of acetylene carbon black and correspondingly from 95 to 25 parts of vulcanized rubber particles varying in size within the range from 6 mesh to 200 mesh, at least 10% of said vulcanized rubber particles being oxidized, the degree of oxidation being such that the rubber particles display an increased tendency to agglomerate together when pressed but do not actually become tacky, said degree of oxidation having been obtained by heating said vulcanized rubber particles at a temperature of from about 150 to 300° F. for a period of from about 5 hours to 2 days, said particles being made up of 20–80% by weight of non-black rubber stock and correspondingly 80–20% of black rubber stock.

3. A sealant composition as in claim 2, containing additionally from 5 to 30 parts, per 100 parts of the mixture, of a particulate phenol-formaldehyde resin.

4. A dry, free-flowing particulate sealant composition for use in a tubeless pneumatic tire comprising, in intimate admixture, the following ingredients, in the stated proportions:

| | Parts by weight |
|---|---|
| 60 mesh abrasion of of vulcanized white sidewall stock | 25 |
| 100 mesh vulcanized black rubber abrasions | 25 |
| Acetylene carbon black | 25 |
| 8 mesh oxidized airplane tread stock raspings | 25 | the degree of oxidation of said oxidized raspings being such that the particles thereof display an increased tendency to agglomerate together when pressed but do not actually become tacky, said degree of oxidation having been obtained by heating said raspings at a temperature of from about 150 to 300° F. for a period of from about 5 hours to 2 days.

5. A dry, free-flowing particulate sealant composition for use in a tubeless pneumatic tire comprising, in intimate admixture, the following ingredients, in the stated proportions:

| | Parts by weight |
|---|---|
| Acetylene carbon black | 33.3 |
| 100 mesh black vulcanized rubber grindings | 33.3 |
| 60 mesh white vulcanized rubber grindings | 33.3 | at least 10% of said vulcanized rubber grindings being oxidized, the degree of oxidation being such that the particles thereof display an increased tendency to agglomerate together when pressed but do not actually become tacky, said degree of oxidation having been obtained by heating said vulcanized rubber grindings at a temperature of from about 150 to 300° F. for a period of from about 5 hours to 2 days.

6. A dry, free-flowing particulate sealant composition for use in a tubeless pneumatic tire comprising, in intimate admixture, the following ingredients, in the stated proportions:

| | Parts by weight |
|---|---|
| 60 mesh abrasions of vulcanized white sidewall stock | 20 |
| 100 mesh vulcanized black rubber abrasions | 20 |
| Acetylene carbon black | 20 |
| 8 mesh oxidized airplane tread stock raspings | 20 |
| 100 mesh thermosetting phenol-formaldehyde resin | 20 | the degree of oxidation of said oxidized raspings being such that the particles thereof display an increased tendency to agglomerate together when pressed but do not actually become tacky, said degree of oxidation having been obtained by heating said raspings at a temperature of from about 150 to 300° F. for a period of from about 5 hours to 2 days.

7. A dry, free-flowing particulate puncture sealing composition for use in a tubeless pneumatic tire having an integral air-retaining liner, comprising, in intimate admixture, carbon black and oxidized vulcanized rubber particles, the degree of oxidation being such that the rubber particles display an increased tendency to agglomerate together when pressed but do not actually become tacky, said degree of oxidation having been obtained by heating said vulcanized rubber particles at a temperature of from about 150 to 300° F. for a period of from about 5 hours to 2 days, such sealant mixture containing from about 5 to about 75 parts by weight of carbon black and correspondingly from about 95 to about 25 parts of rubber particles, said rubber particles varying in size within the range of from 6 mesh to 200 mesh.

8. The sealant composition of claim 7, containing additionally from about 5 to about 30 parts per 100 parts of the mixture of a particulate phenol-formaldehyde resin.

9. In a tubeless pneumatic tire casing having an integral air-retaining liner, the improvement comprising a puncture sealant composition inside said casing, said puncture sealant comprising, in intimate admixture, a particulate mixture of from 5 to 75 parts by weight of carbon black and correspondingly from 95 to 25 parts of vulcanized rubber particles, said vulcanized rubber particles varying in size within the range of from 6 mesh to 200 mesh, the particles of said sealant being capable of matting together under the influence of moderate heat and pressure, whereby when said liner is punctured, escaping air carries said particles into the puncture in the liner wherein the particles are subjected to compression and heat to thereby become matted together and retard the escape of air through the puncture.

10. The tire casing of claim 9 wherein the carbon black is acetylene carbon black.

11. The tire casing of claim 9 wherein at least 10% of said vulcanized rubber particles are oxidized, the degree of oxidation being such that the rubber particles display an increased tendency to agglomerate together when pressed but do not actually become tacky, said degree of oxidation having been obtained by heating said vulcanized rubber particles at a temperature of from about 150 to 300° F. for a period of from about 5 hours to 2 days, and wherein said particles are made up of from 20 to 80 percent by weight of non-black rubber stock and correspondingly from 80 to 20 percent by weight of black rubber stock.

12. The tire casing of claim 11 wherein said particulate mixture contains additionally, per 100 parts thereof, from 5 to 30 parts of a particulate phenol-formaldehyde resin.

References Cited in the file of this patent

UNITED STATES PATENTS

| | | |
|---|---|---|
| 2,392,691 | Popham | Jan. 8, 1946 |
| 2,459,739 | Groton | Jan. 18, 1949 |
| 2,623,024 | Barton | Dec. 23, 1952 |
| 2,853,742 | Dasher | Sept. 30, 1958 |
| 2,867,589 | Richie | Jan. 6, 1959 |